US009467291B2

(12) United States Patent
Terao

(10) Patent No.: US 9,467,291 B2
(45) Date of Patent: Oct. 11, 2016

(54) INFORMATION PROCESSING SYSTEM, INFORMATION PROCESSING METHOD, AND NON-TRANSITORY COMPUTER READABLE MEDIUM FOR PROCESSING REQUESTS USING AN AUTHORITY OBJECT

(71) Applicant: FUJI XEROX CO., LTD., Minato-ku, Tokyo (JP)

(72) Inventor: Taro Terao, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/196,753

(22) Filed: Mar. 4, 2014

(65) Prior Publication Data

US 2015/0026799 A1    Jan. 22, 2015

(30) Foreign Application Priority Data

Jul. 17, 2013   (JP) ................................ 2013-148173

(51) Int. Cl.
*H04L 29/00* (2006.01)
*H04L 9/32* (2006.01)
*H04L 9/00* (2006.01)
*G06F 21/62* (2013.01)

(52) U.S. Cl.
CPC ......... *H04L 9/3213* (2013.01); *G06F 21/6218* (2013.01); *H04L 9/007* (2013.01); *H04L 2209/38* (2013.01)

(58) Field of Classification Search
CPC ........... H04L 2209/60; H04L 2209/80; H04L 9/3213; H04L 9/3247; H04L 9/3242; H04L 63/126; H04L 63/08; H04L 65/4084; H04L 9/3234; H04L 9/007; H04L 2209/38; G06F 21/6218

USPC .......................................................... 726/20
See application file for complete search history.

(56) References Cited

U.S. PATENT DOCUMENTS

| | | | |
|---|---|---|---|
| 8,826,390 B1 * | 9/2014 | Varda ................................. 726/4 |
| 2002/0026592 A1 * | 2/2002 | Gavrila et al. ................ 713/201 |
| 2003/0188198 A1 * | 10/2003 | Holdsworth et al. ......... 713/201 |
| 2005/0246636 A1 * | 11/2005 | Blagsvedt et al. ............ 715/700 |
| 2007/0143214 A1 * | 6/2007 | Colgrave ......................... 705/51 |
| 2008/0288476 A1 * | 11/2008 | Kim .................. G06F 17/30905 |
| 2008/0294478 A1 * | 11/2008 | Joshi .................. G06F 21/6218 726/4 |
| 2009/0019548 A1 * | 1/2009 | Reid ..................... H04L 9/3247 726/27 |
| 2010/0319067 A1 * | 12/2010 | Mohanty et al. ............... 726/21 |

FOREIGN PATENT DOCUMENTS

| | | |
|---|---|---|
| JP | 02-002450 A | 1/1990 |
| JP | 09-251425 A | 9/1997 |

* cited by examiner

*Primary Examiner* — Don Zhao
(74) *Attorney, Agent, or Firm* — Sughrue Mion, PLLC

(57) ABSTRACT

An information processing system includes a management unit that manages information of an object that determines at least one of a parent and a child of the object, a receiving unit that receives specification of an authority object that is an object with which authority information is associated and a request of processing that is to be executed by using the authority object, and a determining unit that determines whether to accept the request or not on the basis of results of a comparison between information of an owner object that is an object that approves the authority information and information of an object that is a parent of the authority object.

7 Claims, 12 Drawing Sheets

FIG. 7A

| OBJECT KEY | VALUE |
|---|---|
| a1f40f99 | 0 |
| bfa67956 | 0 |
|  |  |
|  |  |
|  |  |

FIG. 7B

| OBJECT KEY | PROTOTYPE VALUE | ARTIFACT VALUE | STATE VALUE | CONTENT TYPE VALUE |
|---|---|---|---|---|
| a1f40f99 |  | b6276516 |  |  |
| bfa67956 | a1f40f99 |  | d91742c4 | bacb769b |
|  |  |  |  |  |
|  |  |  |  |  |
|  |  |  |  |  |
|  |  |  |  |  |

FIG. 7C

| KEY | VALUE |
|---|---|
| b6276516 | ["/bfa67956"] |
| d91742c4 | {"owner":"/a1f40f99","client":"/a1f40f99, "scope":"create update delete list"} |
| bacb769b | application/json |
|  |  |
|  |  |
|  |  |
|  |  |
|  |  |

FIG. 8A

| OBJECT KEY | VALUE |
|---|---|
| a1f40f99 | 0 |
| bfa67956 | 0 |
| e356bf46 | 0 |
| | |
| | |

FIG. 8B

| OBJECT KEY | PROTOTYPE VALUE | ARTIFACT VALUE | STATE VALUE | CONTENT TYPE VALUE |
|---|---|---|---|---|
| a1f40f99 | | efbaceb6 | | |
| bfa67956 | a1f40f99 | | d91742c4 | bacb769b |
| e356bf46 | a1f40f99 | | | |
| | | | | |
| | | | | |
| | | | | |

FIG. 8C

| KEY | VALUE |
|---|---|
| b6276516 | ["/bfa67956"] |
| d91742c4 | {"owner":"/a1f40f99","client":"/a1f40f99", "scope":"create update delete list"} |
| bacb769b | application/json |
| efbaceb6 | ["/bfa67956","/e356bf46"] |
| | |
| | |
| | |
| | |

FIG. 9A

| OBJECT KEY | VALUE |
|---|---|
| a1f40f99 | 0 |
| bfa67956 | 0 |
| e356bf46 | 0 |
| | |
| | |
| | |

FIG. 9B

| OBJECT KEY | PROTOTYPE VALUE | ARTIFACT VALUE | STATE VALUE | CONTENT TYPE VALUE |
|---|---|---|---|---|
| a1f40f99 | | efbaceb6 | | |
| bfa67956 | a1f40f99 | | d91742c4 | bacb769b |
| e356bf46 | a1f40f99 | | cf921604 | bacb769b |
| | | | | |
| | | | | |
| | | | | |

FIG. 9C

| KEY | VALUE |
|---|---|
| b6276516 | ["/bfa67956"] |
| d91742c4 | {"owner":"/a1f40f99","client":"/a1f40f99, "scope":"create update delete list"} |
| bacb769b | application/json |
| efbaceb6 | ["/bfa67956","/e356bf46"] |
| cf921604 | {"name":"users"} |
| | |
| | |
| | |

FIG. 10A

| OBJECT KEY | VALUE |
|---|---|
| a1f40f99 | 0 |
| bfa67956 | 0 |
| e356bf46 | 0 |
| de75e969 | 0 |
| | |
| | |

FIG. 10B

| OBJECT KEY | PROTOTYPE VALUE | ARTIFACT VALUE | STATE VALUE | CONTENT TYPE VALUE |
|---|---|---|---|---|
| a1f40f99 | | 877e9307 | | |
| bfa67956 | a1f40f99 | | d91742c4 | bacb769b |
| e356bf46 | a1f40f99 | | cf921604 | bacb769b |
| de75e969 | a1f40f99 | | | |
| | | | | |
| | | | | |

FIG. 10C

| KEY | VALUE |
|---|---|
| b6276516 | ["/bfa67956"] |
| d91742c4 | {"owner":"/a1f40f99","client":"/a1f40f99, "scope":"create update delete list"} |
| bacb769b | application/json |
| efbaceb6 | ["/bfa67956","/e356bf46"] |
| cf921604 | {"name":"users"} |
| 877e9307 | ["/bfa67956","/e356bf46","/de75e969"] |
| | |
| | |
| | |

FIG. 11A

| OBJECT KEY | VALUE |
|---|---|
| a1f40f99 | 0 |
| bfa67956 | 0 |
| e356bf46 | 0 |
| de75e969 | 0 |
| | |
| | |

FIG. 11B

| OBJECT KEY | PROTOTYPE VALUE | ARTIFACT VALUE | STATE VALUE | CONTENT TYPE VALUE |
|---|---|---|---|---|
| a1f40f99 | | 877e9307 | | |
| bfa67956 | a1f40f99 | | d91742c4 | bacb769b |
| e356bf46 | a1f40f99 | | cf921604 | bacb769b |
| de75e969 | a1f40f99 | | 2caf88b1 | bacb769b |
| | | | | |
| | | | | |

FIG. 11C

| KEY | VALUE |
|---|---|
| b6276516 | ["/bfa67956"] |
| d91742c4 | {"owner":"/a1f40f99","client":"/a1f40f99, "scope":"create update delete list"} |
| bacb769b | application/json |
| efbaceb6 | ["/bfa67956","/e356bf46"] |
| cf921604 | {"name":"users"} |
| 877e9307 | ["/bfa67956","/e356bf46","/de75e969"] |
| 2caf88b1 | {"owner":"/e356bf46","client":"/e356bf46", "scope":"create update delete list"} |
| | |
| | |

FIG. 12A

| OBJECT KEY | VALUE |
|---|---|
| a1f40f99 | 0 |
| bfa67956 | 0 |
| e356bf46 | 0 |
| de75e969 | 0 |
| 1ff64df4 | 0 |
| | |

FIG. 12B

| OBJECT KEY | PROTOTYPE VALUE | ARTIFACT VALUE | STATE VALUE | CONTENT TYPE VALUE |
|---|---|---|---|---|
| a1f40f99 | | 877e9307 | | |
| bfa67956 | a1f40f99 | | d91742c4 | bacb769b |
| e356bf46 | a1f40f99 | 59001398 | cf921604 | bacb769b |
| de75e969 | a1f40f99 | | 2caf88b1 | bacb769b |
| 1ff64df4 | e356bf46 | | | |
| | | | | |

FIG. 12C

| KEY | VALUE |
|---|---|
| b6276516 | ["/bfa67956"] |
| d91742c4 | {"owner":"/a1f40f99","client":"/a1f40f99","scope":"create update delete list"} |
| bacb769b | application/json |
| efbaceb6 | ["/bfa67956","/e356bf46"] |
| cf921604 | {"name":"users"} |
| 877e9307 | ["/bfa67956","/e356bf46","/de75e969"] |
| 2caf88b1 | {"owner":"/e356bf46","client":"/e356bf46","scope":"create update delete list"} |
| 59001398 | ["/1ff64df4"] |
| | |

FIG. 13A

| OBJECT KEY | VALUE |
|---|---|
| a1f40f99 | 0 |
| bfa67956 | 0 |
| e356bf46 | 0 |
| de75e969 | 0 |
| 1ff64df4 | 0 |
| | |

FIG. 13B

| OBJECT KEY | PROTOTYPE VALUE | ARTIFACT VALUE | STATE VALUE | CONTENT TYPE VALUE |
|---|---|---|---|---|
| a1f40f99 | | 877e9307 | | |
| bfa67956 | a1f40f99 | | d91742c4 | bacb769b |
| e356bf46 | a1f40f99 | 59001398 | cf921604 | bacb769b |
| de75e969 | a1f40f99 | | 2caf88b1 | bacb769b |
| 1ff64df4 | e356bf46 | | 2caf88b1 | bacb769b |
| | | | | |

FIG. 13C

| KEY | VALUE |
|---|---|
| b6276516 | ["/bfa67956"] |
| d91742c4 | {"owner":"/a1f40f99","client":"/a1f40f99","scope":"create update delete list"} |
| bacb769b | application/json |
| efbaceb6 | ["/bfa67956","/e356bf46"] |
| cf921604 | {"name":"users"} |
| 877e9307 | ["/bfa67956","/e356bf46","/de75e969"] |
| 2caf88b1 | {"owner":"/e356bf46","client":"/e356bf46","scope":"create update delete list"} |
| 59001398 | ["/1ff64df4"] |
| | |

FIG. 14A

| OBJECT KEY | VALUE |
|---|---|
| a1f40f99 | 0 |
| bfa67956 | 0 |
| e356bf46 | 0 |
| de75e969 | 0 |
| 1ff64df4 | 0 |
| 87ad557f | 0 |

FIG. 14B

| OBJECT KEY | PROTOTYPE VALUE | ARTIFACT VALUE | STATE VALUE | CONTENT TYPE VALUE |
|---|---|---|---|---|
| a1f40f99 | | 877e9307 | | |
| bfa67956 | a1f40f99 | | d91742c4 | bacb769b |
| e356bf46 | a1f40f99 | 3c702e3c | cf921604 | bacb769b |
| de75e969 | a1f40f99 | | 2caf88b1 | bacb769b |
| 1ff64df4 | e356bf46 | | 2caf88b1 | bacb769b |
| 87ad557f | e356bf46 | | | |

FIG. 14C

| KEY | VALUE |
|---|---|
| b6276516 | ["/bfa67956"] |
| d91742c4 | {"owner":"/a1f40f99,"client":"/a1f40f99, "scope":"create update delete list"} |
| bacb769b | application/json |
| efbaceb6 | ["/bfa67956","/e356bf46"] |
| cf921604 | {"name":"users"} |
| 877e9307 | ["/bfa67956","/e356bf46","/de75e969"] |
| 2caf88b1 | {"owner":"/e356bf46,"client":"/e356bf46, "scope":"create update delete list"} |
| 59001398 | ["/1ff64df4"] |
| 3c702e3c | ["/1ff64df4","/87ad557f"] |

INFORMATION PROCESSING SYSTEM, INFORMATION PROCESSING METHOD, AND NON-TRANSITORY COMPUTER READABLE MEDIUM FOR PROCESSING REQUESTS USING AN AUTHORITY OBJECT

CROSS-REFERENCE TO RELATED APPLICATIONS

This application is based on and claims priority under 35 USC 119 from Japanese Patent Application No. 2013-148173 filed Jul. 17, 2013.

BACKGROUND (i) Technical Field

The present invention relates to an information processing system, an information processing method, and a non-transitory computer readable medium.

(ii) Related Art

In a server that manages objects, there is a case where processing such as creation, acquisition, change, or deletion is performed on the objects in accordance with the authority of a client that is a request source of the processing. Since there is a case where creation, change, deletion, and the like are performed on objects that are managed by a server, when authority is fixedly associated with a client independently of the objects, it may sometimes be difficult to perform such processing on the objects in a flexible manner in accordance with the authority of the client.

SUMMARY

According to an aspect of the invention, there is provided an information processing system including a management unit that manages information of an object that determines at least one of a parent and a child of the object, a receiving unit that receives specification of an authority object that is an object with which authority information is associated and a request of processing that is to be executed by using the authority object, and a determining unit that determines whether to accept the request or not on the basis of results of a comparison between information of an owner object that is an object that approves the authority information and information of an object that is a parent of the authority object.

BRIEF DESCRIPTION OF THE DRAWINGS

Exemplary embodiments of the present invention will be described in detail based on the following figures, wherein:

FIGS. 7A to 7C are diagrams illustrating examples of management tables that manage data;

FIGS. 8A to 8C are diagrams illustrating examples of management tables that manage data;

FIGS. 9A to 9C are diagrams illustrating examples of management tables that manage data;

FIGS. 10A to 10C are diagrams illustrating examples of management tables that manage data;

FIGS. 11A to 11C are diagrams illustrating examples of management tables that manage data;

FIGS. 12A to 12C are diagrams illustrating examples of management tables that manage data;

FIGS. 13A to 13C are diagrams illustrating examples of management tables that manage data;

FIGS. 14A to 14C are diagrams illustrating examples of management tables that manage data.

DETAILED DESCRIPTION

An exemplary embodiment of the present invention will be described below with reference to the drawings.

[1. Description of Functions Provided to Information Processing Apparatus]

Figure 1:
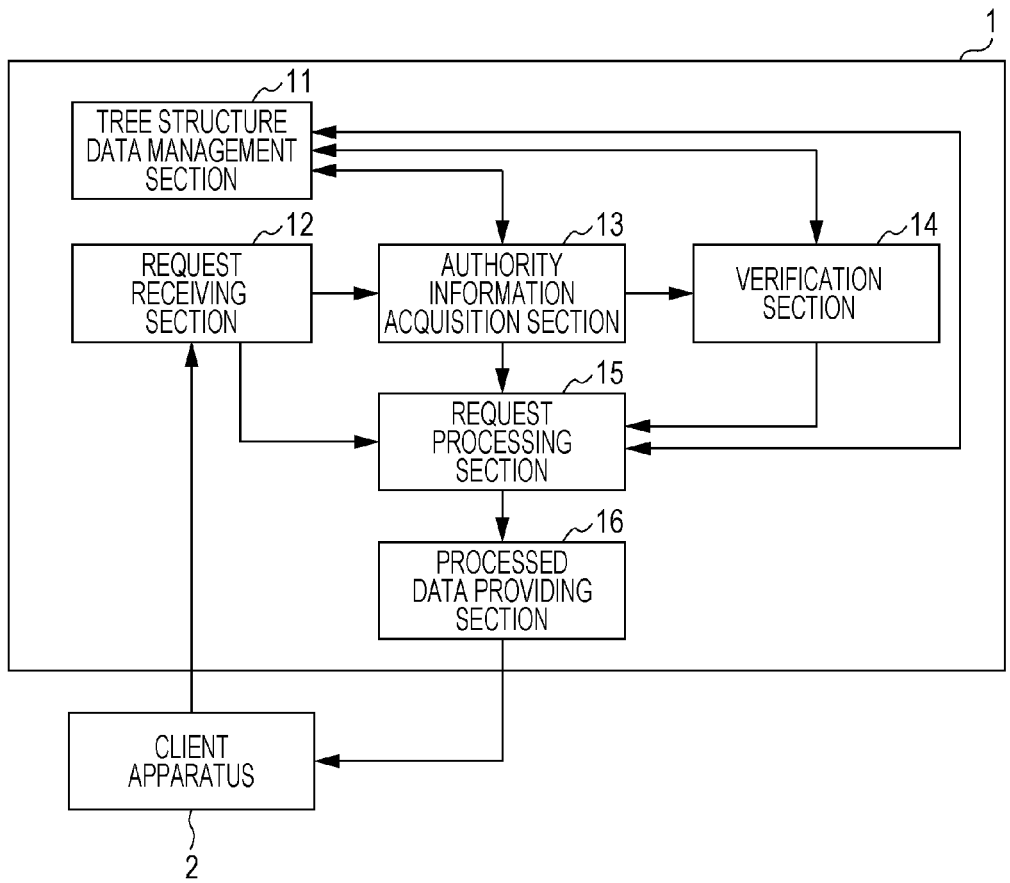
FIG. 1 is a functional block diagram of an information processing apparatus according to an exemplary embodiment.

FIG. 1 is a functional block diagram of an information processing apparatus 1 according to an exemplary embodiment. As illustrated in FIG. 1, the information processing apparatus 1 includes a tree structure data management section 11, a request receiving section 12, an authority information acquisition section 13, a verification section 14, a request processing section 15, and a processed data providing section 16.

In a computer that includes a controller such as a central processing unit (CPU), a memory such as a semiconductor memory or a magnetic disk unit, and a communication unit such as a network interface, the controller executes a program that is stored in the memory, so that functions of the above-mentioned sections, which are provided in the information processing apparatus 1, may be realized. Note that, a program may be supplied to the information processing apparatus 1 while stored in an information storage medium or may be supplied to the information processing apparatus 1 via a data communication unit such as the internet. Details of each of the sections, which are provided in the information processing apparatus 1, will be described below.

The tree structure data management section 11 manages two or more objects that form a tree structure. Here, except for a root object that is present in a series, each object has only one parent object (a prototype). A root object does not have a prototype. When an object A is the prototype of an object B, it may be said that the object B is an artifact of the object A. On the basis of a prototype relationship between objects, the set of all the objects may be represented by a tree structure. As long as a tree structure does not break, the tree structure may be modified by linking an object with a prototype that is different from the original prototype of the object. Each of the objects that are managed by the tree structure data management section 11 may have a value. In the context of REpresentational State Transfer architectural style (REST), an object may sometimes be referred to as a resource, and a value may sometimes be referred to as a representation. Such objects each having a value include an object called an access token that represents authority information. Examples of objects may include an object that represents only a pure identity that is simply formed of only an object identifier and a prototype, an object that represents data that includes a value of an arbitrary content type, and an object that represents an access token, which is a credential that proves access qualification, or an entity such as a resource owner, which is an owner of an object, or an application (a client) that accesses the object under the resource owner's approval. These objects are included in one tree structure. The tree structure data management section 11 executes addition of an object that is to be managed by the tree structure data management section 11, and update, information readout, or deletion of objects that are managed by the tree structure data management section 11, or the like in response to an instruction that is received from a client apparatus 2. An example of data that is managed by the tree structure data management section 11 will be described below.

FIGS. 2 to 6 illustrate display examples in each of which objects that are managed by the tree structure data management section 11 are represented in a tree structure, and FIGS. 7A to 14C illustrate examples of management tables that manage data of the objects, which form the tree structures. Here, data configuration examples of the objects, which are managed by the tree structure data management section 11, will be described with reference to FIG. 2 and FIGS. 7A to 7C that illustrate data configuration examples of the management tables that correspond to FIG. 2.

Figure 2:
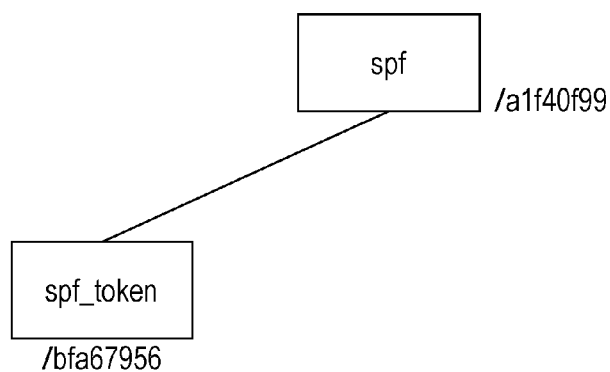
FIG. 2 is a diagram illustrating an example of a tree structure.

FIGS. 7A to 7C illustrate examples of resource management tables that hold data of the tree structure data illustrated in FIG. 2. FIG. 7A illustrates a validation management table, FIG. 7B illustrates an object management table, and FIG. 7C illustrates a data content management table.

As illustrated in FIG. 7A, the validation management table includes one or more records each of which includes fields, which are KEY and VALUE of an object. KEY is an object ID and may be, for example, a random number of about 32 bytes that is generated by a system in a random manner when an object is created. In the exemplary embodiment, as an example, a four-byte hexadecimal encoded value is used as KEY. VALUE is a flag value and may be, for example, a truth value. In the tree structure illustrated in FIG. 2, the object key of an object "spf" and the object key of an object "spf_token" are "a1f40f99" and "bfa67956", respectively, and both of the objects are validated ("0"). Note that in the case of invalidating an object, in the validation management table, the value stored in VALUE that is associated with the object key of the object may be updated to "1".

As illustrated in FIG. 7B, the object management table includes one or more records each of which includes fields, which are OBJECT KEY (object ID), PROTOTYPE VALUE, ARTIFACT VALUE, STATE VALUE, and CONTENT TYPE VALUE. An object ID is stored in OBJECT KEY. An object ID of the parent object of an object is stored in PROTOTYPE VALUE. A key (which may be, for example, a hash value) of a record in the data content management table, in which an object ID of an artifact of an object is stored, is stored in ARTIFACT VALUE. A key (which may be, for example, a hash value) of a record in the data content management table, which shows the data contents of an object, is stored in STATE VALUE. A key (which may be, for example, a hash value) of a record in the data content management table, which shows a type of an object, is stored in CONTENT TYPE VALUE.

As illustrated in FIG. 7C, in the data content management table in which the data contents of objects are stored, data contents are stored in such a manner as to be associated with corresponding keys (e.g., the values that are stored in ARTIFACT VALUE, STATE VALUE, and CONTENT TYPE VALUE). For example, in the data content management table, information of a list of artifacts of an object is stored in such a manner as to be associated with the key of the object in ARTIFACT VALUE. In addition, for example, in the data content management table, information of {"owner":object ID of owner, "client":object ID of client, "scope":character string representing scope} is associated with the key is stored in STATE VALUE that is associated with an object, which is an access token. Every processing request is accompanied by an access token, and in this case, an owner is treated as a requester of the processing, and a client is treated as a proxy requester of the processing. A scope includes information of a type of processing that is approved such as creation (C: create), update (U: update), deletion (D: delete), list acquisition (L: list), or the like. Note that, a scope may include information of processing for which a client has authority. For example, in the data content management table, for example, information of the data type of an object may be associated with the key stored in CONTENT TYPE VALUE that is associated with the object.

The request receiving section 12 receives a request of processing that is to be performed on an object that is managed by the tree structure data management section 11 from the client apparatus 2. In addition, the request receiving section 12 retrieves information of an access token (a key of authority information) along with the request.

The authority information acquisition section 13 acquires, on the basis of the access token, which has been received by the request receiving section 12, authority information (e.g., owner information, client information, and scope information) that relates to the request, which has been received. For example, in the case where the access token, which has been received by the request receiving section 12, is valid in the validation management table, the authority information acquisition section 13 searches for, by using the access token as a key, a record that corresponds to the key from the object management table. In this case, when the record, which corresponds to the key, is not retrieved from the object management table, the authority information acquisition section 13 may output a retrieval error to the verification section 14. When the record, which corresponds to the key, is retrieved from the object management table, the authority information acquisition section 13 searches for, by using a value that is stored in STATE VALUE of the record, which has been retrieved as a key (a particular key), a record that corresponds to the particular key from the data content management table. In this case, when the record, which corresponds to the particular key, is not retrieved from the data content management table, the authority information acquisition section 13 may output a retrieval error to the verification section 14. When the record, which corresponds to the particular key, is retrieved from the data content management table, the authority information acquisition section 13 acquires data (owner information, client information, and scope information) that is stored in VALUE of the record, which has been retrieved, as authority information, verifies the owner information and the client information (verifies whether or not an owner and a client have valid object IDs), and outputs the authority information to verification section 14.

The verification section 14 executes verification based on comparison between the authority information, which has been acquired by the authority information acquisition section 13, and information of a parent object (a prototype object) of the access token, which has been received by the request receiving section 12. For example, when the verification section 14 is informed of a retrieval error by the authority information acquisition section 13, the verification section 14 outputs the retrieval error to the request processing section 15. The verification section 14 verifies whether or not owner information (an owner object) that is included in the authority information, which has been acquired by the authority information acquisition section 13, matches the parent object (the prototype object) of the access token, which has been received by the request receiving section 12. The verification section 14 determines that the verification is successful when the parent object (the prototype object) of the access token is included in a path (a prototype chain) that sequentially links a parent object of the owner object and a parent object of the parent object, and otherwise, the verification section 14 determines that the verification is not successful. The verification section 14 informs the request processing section 15 of the verification results.

Processing that is related to a notification queue will now be described. First, in the case where an access token that has been received by the request receiving section 12 is verified, the prototype of the access token, which has been received by the request receiving section 12, has a queue (a notification queue) in which a notification is to be stored (an empty queue is set as the notification queue). In addition, in the case where the access token, which has been received by the request receiving section 12, is verified, when the prototype of the access token is included in a prototype chain of an owner object that is specified by the access token, a search is performed for an object that has a notification queue along the prototype chain starting from the owner object, and an object that is found first is set as a notification destination.

On the basis of the request, which has been received by the request receiving section 12, the authority information, which is acquired by the authority information acquisition section 13, and the verification results of which the request processing section 15 has been informed by the verification section 14, the request processing section 15 controls execution of processing that relates to the request. For example, in the case where the processing, which relates to the request received by the request receiving section 12, is included in scope information of the authority information, which has been acquired by the authority information acquisition section 13, and in addition, in the case where a condition that the verification results, of which the request processing section 15 has been informed by the verification section 14, show that the verification is successful and a condition with respect to a relationship between a target resource (a target object of the request) and the owner (the object), which is specified by the access token (for example, whether or not the owner has a privilege to the target resource) are satisfied, the request processing section 15 may execute the processing, which relates to the request received by the request receiving section 12, and outputs the execution results to the processed data providing section 16. When the above-described conditions are not satisfied, the request processing section 15 may output an error to the processed data providing section 16 by not accepting the processing, which relates to the request. Alternatively, even in the case where the request, which has been received, does not satisfy the above-described conditions, the request processing section 15 may hold the processing (e.g., update) and may inform the prototype of the target resource of a request of the processing (e.g., update). In this case, in the case where the prototype of the target resource does not have a notification queue, an object having a notification queue (a notification destination object) that is found first in a prototype chain of the target resource is informed of the request. Here, after the notification destination object has noticed the notification that is stored in the notification queue, the notification destination object may execute the processing on the target resource (e.g., setting of a value) by using its own access token or may simply delete the notification from the queue.

Examples of processing (acquisition of a list of artifacts, creation of an artifact, acquisition of an object representation, update of an object representation, deletion of an object, acquisition of a prototype, update of a prototype, or the like) that is executed by the request processing section 15, in the case where a request from the client apparatus 2 is accepted, in accordance with the request, which is received, will be described below. In the examples that will be described below, as an example, the case where the request that is transmitted from the client apparatus 2 to the information processing apparatus 1 uses REST API in an HTTPS transport, and an access token is included in an HTTP request header will be described.

In the case where the request, which is received, is "GET /", the request processing section 15 retrieves, by using an owner object that is included in authority information as a key, a record that corresponds to the key from the object management table, retrieves a record that corresponds to the value of ARTIFACT VALUE that is included in the record that has been retrieved from the data content management table, and outputs the value of VALUE that is included in the record, which has been retrieved, to the processed data providing section 16 as processing results.

In the case where the request, which is received, is "POST /", the request processing section 15 creates a key (an object ID) of a new object having the owner object that is included in the authority information as a parent thereof. The object ID may be created by, for example a random number. Then, the request processing section 15 adds a record in which the object ID, which has been created, and information of a prototype object are stored in the object management table, and outputs the object ID, which has been created, to the processed data providing section 16 as processing results. Then, the request processing section 15 may update the value of the prototype object stored in ARTIFACT VALUE and may add a record that includes the value, which has been updated, in KEY and list information that includes information of an object that is newly created in a list.

In the case where the request, which is received, is "GET /{id}", the request processing section 15 retrieves, by using {id} as an object key, a record that corresponds to the object key from the object management table, refers to a value stored in STATE VALUE that is included in the record, which has been retrieved, retrieves, by using the value which the request processing section 15 has referred to as a key, a record that corresponds to the key from the data content management table, and outputs a value of VALUE that is included in the record that has been retrieved to the processed data providing section 16 as processing results.

In the case where the request, which is received, is "PUT /{id}", when an owner that is specified by the access token has a privilege over a target object that is determined by {id} (i.e., when the owner, which is specified by the access token, is included in a prototype chain of the target object), the request processing section 15 retrieves, by using {id} as an object key, a record that corresponds to the object key from the object management table, refers to a value stored in STATE VALUE that is included in the record that has been retrieved, retrieves, by using the value which the request processing section 15 has referred to as a key, a record that corresponds to the key from the data content management table, and updates a value of VALUE that is included in the record that has been retrieved in accordance with update information that is received along with the request.

In the case where the request, which is received, is "DELETE /{id}", when the owner, which is specified by the access token, has a privilege over a target object that is determined by {id} (i.e., when the owner, which is specified by the access token, is included in a prototype chain of the target object), the request processing section 15 retrieves, by using {id} as an object key, a record that corresponds to the object key from the object management table. In the case where no value is stored in ARTIFACT VALUE of the record that has been retrieved, (i.e., the target object does not have an artifact), the request processing section 15 may update the value stored in VALUE that corresponds to the object key {id} to an invalidation value (1) in the validation management table. In the case where a value is stored in ARTIFACT VALUE of the record, which has been retrieved, the request processing section 15 may output an error to the processed data providing section 16.

In the case where the request, which is received, is "GET /{id}/prototype", the request processing section 15 retrieves, by using {id} as an object key, a record that corresponds to the object key the object management table and outputs a value stored in PROTOTYPE VALUE that is included in the record that has been retrieved to the processed data providing section 16 as processing results.

In the case where the request, which is received, is "PUT /{id}/prototype", and where the body of the request is an object ID of a new prototype, the owner (a requester), which is specified by the access token, is the current prototype of a target resource (an object that is determined by {id}), and in the case where change of the prototype does not break a tree structure, the request processing section 15 reserves the new prototype. Then, the requester is reserved as the new prototype, and in the case where the change of the prototype does not break the tree structure, the request processing section 15 completes setting of the new prototype (i.e., executes update of the prototype). In any cases other than the above-described case, the request processing section 15 rejects the request. For example, when the original prototype of an object C is A, and the new prototype of the object C is B, in the case where both of a first instruction that is "requester=A, new prototype=B, target object=C" and a second instruction that is "requester=B, new prototype=B, target object=C" do not break the tree structure at the timing for each of the instructions, the request processing section 15 may execute processing of changing the prototype of the object C from A to B.

The processed data providing section 16 provides processing results of which the processed data providing section 16 is informed by the request processing section 15 to the client apparatus 2. Note that in the case where the processed data providing section 16 is informed of an error by the request processing section 15, the processed data providing section 16 may inform the client apparatus 2 of the error.

For each of the objects that are managed by the tree structure data management section 11, a queue that holds a request that is pending for execution on the object may be prepared, and an owner of the object may be allowed to read or delete items that are held by the queue, which is prepared for the object. Here, each of the items, which are held by the queue, is a hash value of a header and a body of an HTTP request, and the contents of a body may be stored in such a manner as to be referable from a hash value. When the contents of a request are appropriate, the owner of the object may execute the request by performing a replay using an access token of the owner. However, in the case where the original HTTP request header is stored as is, an access token that would have been kept secret will be known by the owner of the object (i.e., the owner may pretend to be an entity that has made the original request), and thus, the access token in the request header may be replaced by not an object identifier but a hash value that is allocated to the object identifier (i.e., the hash value with respect to the object identifier (the access token) that is managed by the data content management table), so that leaking of the access token may be prevented. With this configuration, although the contents of the token ({"owner":object ID of owner, "client":object ID of client, "scope":character string representing scope} as a JSON object) may be determined from the hash value, the access token itself will not be known by the owner.

[2. Description of Specific Examples of Processing]

Specific examples of object addition processing and object update processing that are executed in the information processing apparatus 1 according to the exemplary embodiment will be described below with reference to FIG. 2 to FIG. 14C.

FIG. 2 illustrates a tree structure that is formed of objects each of which is in an initial state. As illustrated in FIG. 2, in the tree structure, which is formed of the objects each of which is in the initial state, an object "spf_token" that is an access token for root is provided as an artifact of an object "spf" that is a root object. The data of the tree structure illustrated in FIG. 2 corresponds to the management tables illustrated in FIGS. 7A to 7C (the validation management table, the object management table, and the data content management table).

Figure 3:
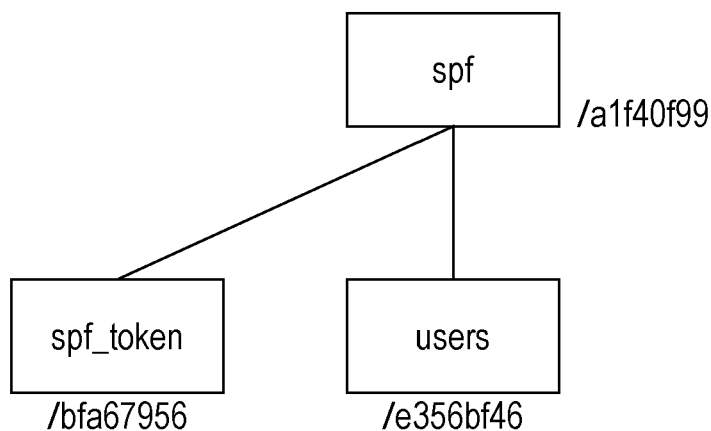
FIG. 3 is a diagram illustrating an example of a tree structure.

Next, as illustrated in FIG. 3, processing of adding an object "users" as an artifact of the object "spf" in the tree structure, which is formed of the objects, will be described. In this case, first, the client apparatus 2 throws a request "POST /" to the information processing apparatus 1 by using the access token "spf_token". As a result, as illustrated in FIGS. 8A to 8C, the information processing apparatus 1 creates a new object key, adds a record of the object key, which is created, to a validation management table of FIG. 8A and an object management table of FIG. 8B. In addition, the information processing apparatus 1 updates the value of ARTIFACT VALUE with respect to a prototype object (the "spf" object in this example) to which the artifact is added in the object management table of FIG. 8B and adds the value of ARTIFACT VALUE with respect to the prototype object in and a data content management table of FIG. 8C. Note that, the data in FIGS. 8A to 8C that is changed from FIGS. 7A to 7C is underlined. The information processing apparatus 1 informs the client apparatus 2 of the object key (e356bf46) that has been added.

The client apparatus 2 throws a request (PUT /e356bf46) for updating the information of the object key (e356bf46) of which the client apparatus 2 has been informed from the information processing apparatus 1 and the updated contents {"name":"users"} to the information processing apparatus 1 by using the access token "spf_token". As a result, as illustrated in FIGS. 9A to 9C, the data contents of the object key (e356bf46) are registered in an object management table of FIG. 9B and a data content management table of FIG. 9C. Note that, the data in FIGS. 9A to 9C that is changed from FIGS. 8A to 8C is underlined.

Figure 4:
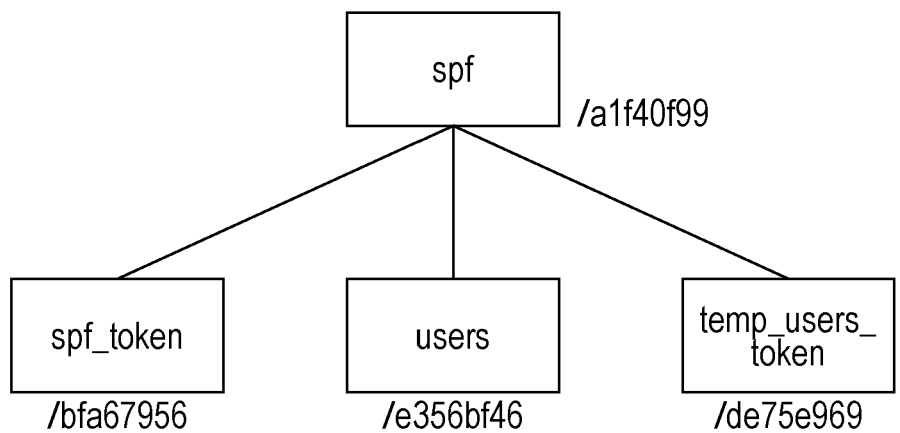
FIG. 4 is a diagram illustrating an example of a tree structure.

Next, as illustrated in FIG. 4, an object "temp_users_token" is added as a temporary access token of the object "users". The client apparatus 2 may newly add an object by throwing a request "POST /" to the information processing apparatus 1 by using the object "spf_token". FIGS. 10A to 10C illustrate management tables to which an object key (de75e969) of the object "temp_users_token" is added. Note that, the data in FIGS. 10A to 10C that is changed from FIGS. 9A to 9C is underlined.

The client apparatus 2 throws a request (PUT /de75e969) for updating the information of the object key (de75e969) of which the client apparatus 2 has been informed from the information processing apparatus 1 and the updated contents {"owner":"/e356bf46", "client":"/e356bf46", "scope":"create update delete list"} to the information processing apparatus 1 by using the access token "spf_token". As a result, as illustrated in FIGS. 11A to 11C, authority information having the object "users" as an owner is set for the object key (de75e969) in an object management table of FIG. 11B and a data content management table of FIG. 11C. Note that, the data in FIGS. 11A to 11C that is changed from FIGS. 10A to 10C is underlined.

Figure 5:
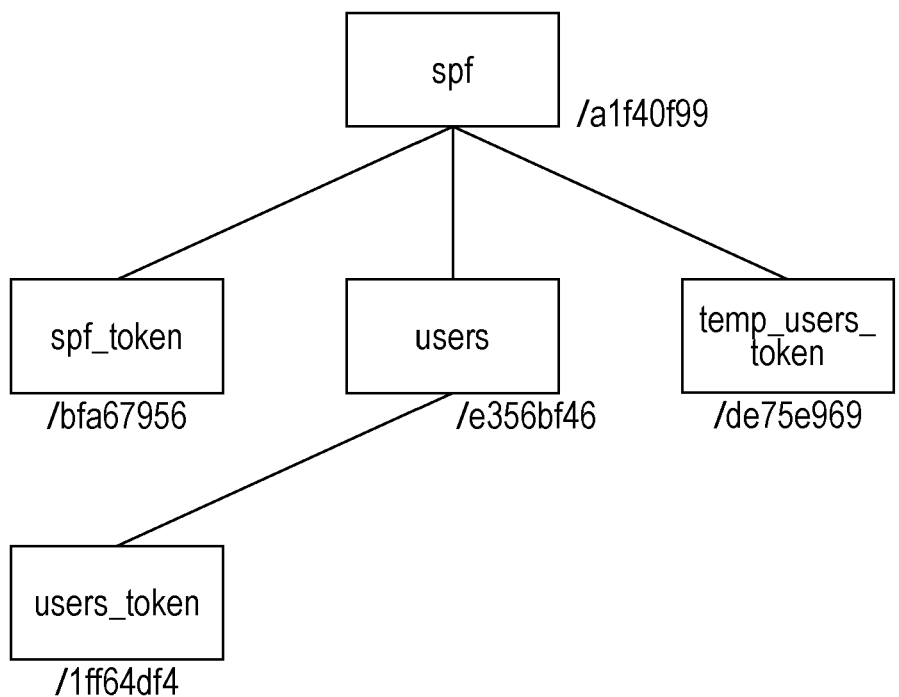
FIG. 5 is a diagram illustrating an example of a tree structure.

Next, as illustrated in FIG. 5, the client apparatus 2 adds an object "users_token" as a child of the object "users" by using the access token "temp_users_token". In other words, the client apparatus 2 may newly add an object by throwing a request "POST /" to the information processing apparatus 1 by using the object "temp_users_token". FIGS. 12A to 12C illustrate management tables to which an object key (1ff64df4) of the object "users_token" is added. Note that, the data in FIGS. 12A to 12C that is changed from FIGS. 11A to 11C is underlined.

Here, the client apparatus 2 throws a request (PUT /1ff64df4) for updating the information of the object key (1ff64df4) of which the client apparatus 2 has been informed from the information processing apparatus 1 and the updated contents {"owner":"/e356bf46", "client":"/e356bf46", "scope":"create update delete list"} to the information processing apparatus 1 by using the access token "temp_users_token". As a result, as illustrated in FIGS. 13A to 13C, authority information having the object "users" as an owner is set for the object key (1ff64df4) in an object management table of FIG. 13B and a data content management table of FIG. 13C. Note that, the data in FIGS. 13A to 13C that is changed from FIGS. 12A to 12C is underlined.

Figure 6:
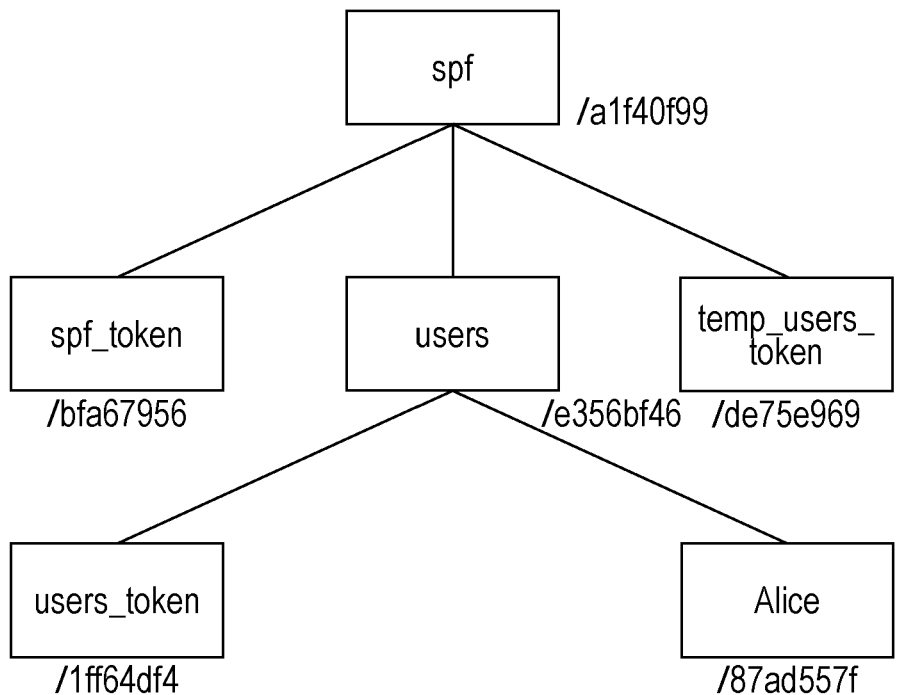
FIG. 6 is a diagram illustrating an example of a tree structure.

Next, as illustrated in FIG. 6, the client apparatus 2 adds an artifact "Alice" to the object "users" by using the access token "users_token". In other words, the client apparatus 2 may newly add an object by throwing a request "POST /" to the information processing apparatus 1 by using the object "users_token". FIGS. 14A to 14C illustrate management tables to which an object key (87ad557f) of the artifact "Alice" is added. Note that, the data in FIGS. 14A to 14C that is changed from FIGS. 13A to 13C is underlined.

As described above, by executing addition of an access token and addition and update of an object, authority information and resources may be provided in the same tree structure, and detailed authority information may be set for each of the resources.

An example of notification processing that is executed in the case where an owner that is specified by an access token and a prototype (a parent object) are different from each other will now be described with reference to a tree structure of objects illustrated in FIG. 15. Note that a type of access token that has a prototype (a parent object) that is different from the owner that is specified by the access token will be referred to as a singular token.

Figure 15:
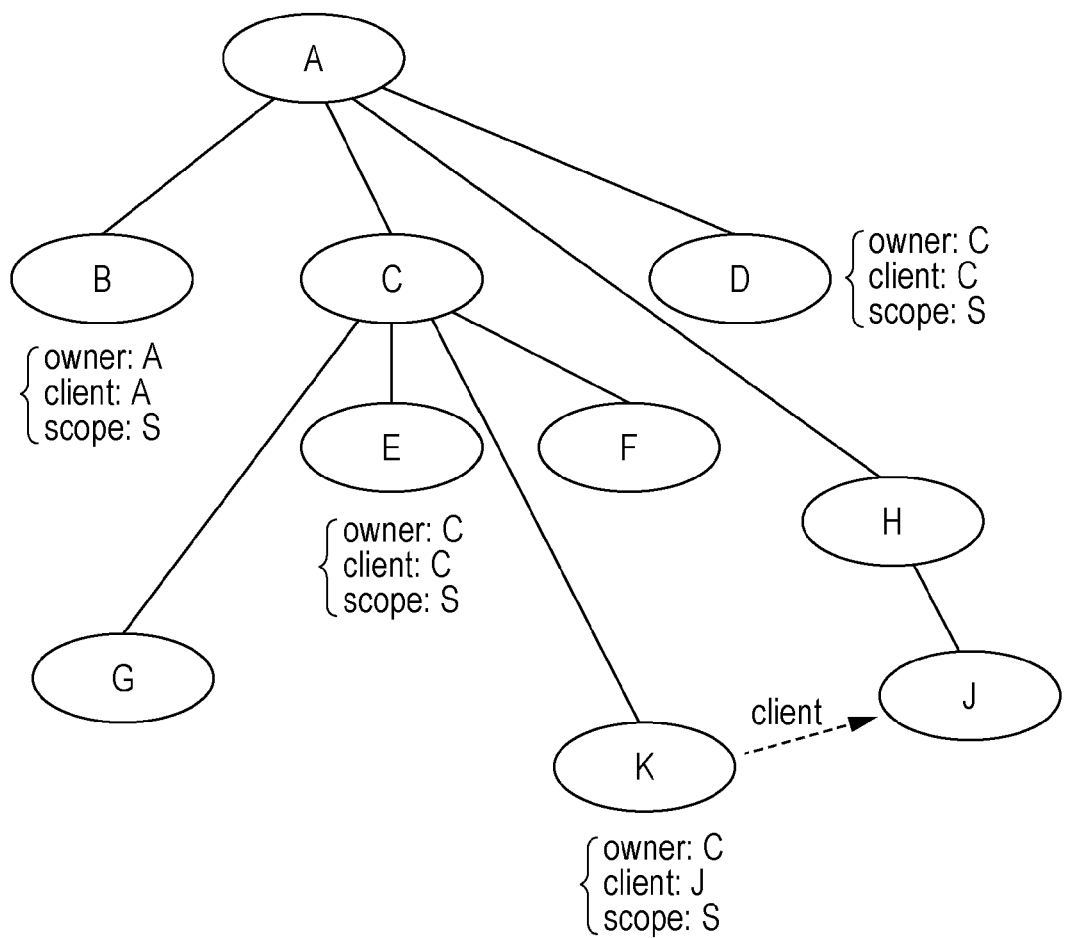
FIG. 15 is a diagram illustrating an example of a tree structure.

As illustrated in FIG. 15, an object B that is an artifact of an object A is an access token. Each of the owner and the client of the access token is the object A, and the scope of the access token is s="create update delete list".

Next, assume that an object C is created by utilizing the object B (hereinafter referred to as "a token B"). In this case, when the token B is utilized, the object A that is the prototype of the token B has a queue in which a notification is to be stored.

Next, assume that a token D is created by utilizing the token B. In this case, the object A is the prototype of the token D, each of the owner and the client of the token D is the object C, and the scope of the token D is s.

Next, assume that a token E is created by utilizing the token D. In this case, when the token D is verified, it is sensed that the token D is a singular token, and a notification is issued to the object C that is the owner of the token D. In this case, a search is performed for an object that has a notification queue along a prototype chain starting from the object C, and an object that is found first (the object A) is set to be a notification destination.

Next, assume that an object F is created by utilizing the token E. In this case, the token E is verified, and the object C that is the prototype of the token E has a queue in which a notification is to be stored.

Assume that an object G is created by utilizing the token D. In this case, it is sensed that the token D is a singular token, a notification is issued to the object C, which is the owner of the token D, and the notification is stored in the queue of the object C.

In addition, there is a token K that has the object C as a parent thereof, and in the case where the owner of the token K is the object C, the client of the token K (an object to which the authority of the owner is delegated) is the object J, and the scope of the token K is s, the object J may create, for example, the object G that is an artifact of the object C on behalf of the object C.

Other exemplary embodiments of the invention will be described below.

(1) In the information processing apparatus 1 according to the exemplary embodiment, in the case where a prototype of an object that has a corresponding owner attribute thereof (hereinafter referred to as an access token) matches an owner, (the access token is referred to as a normal access token in this case), transmission of a method that is accompanied by the access token may be considered to be approved by the owner and may be accepted.

(2) In (1), in the case where the prototype of the access token is included in a prototype chain of the owner (the access token is referred to as a singular access token in this case), transmission of a method that is accompanied by the access token may be considered to be approved by the owner and may be accepted.

(3) In (2), in the case where the transmission of the method, which is accompanied by the singular access token, is accepted, the owner may be informed of the acceptance.

(4) In (2), in the case where the transmission of the method, which is accompanied by the singular access token, is accepted, the prototype of the access token may be informed of the acceptance.

(5) In (1) to (4), the information processing apparatus 1 may have a method (cloning) for creation of an object, and an object that is created may be a clone of the owner (i.e., the owner is the prototype of the object).

(6) In (1) to (5), the access token has a corresponding client attribute thereof, and transmission of a method that is accompanied by the access token may be considered to be delegated to a client that is specified.

(7) In (1) to (6), the access token has a corresponding scope attribute thereof, and transmission of a method that is accompanied by the access token may be considered to be delegated in the range of the scope that is specified.

(8) In (1) to (7), the information processing apparatus 1 may have a method (clone listing) for acquisition of a list of clones and may return a collection of clones of the owner.

(9) In (1) to (8), the information processing apparatus 1 may have a method for acquisition of a representation of a target object.

(10) In (1) to (9), the information processing apparatus 1 may have a method for update of a representation of a target object, and the update of a representation may be executed only when the prototype of the target object approves the execution of the update of a representation.

(11) In (1) to (10), the information processing apparatus 1 may have a method for deletion of a target object, and the deletion may be executed only when the prototype of the target object approves the execution of the deletion.

(12) In (1) to (11), the methods may be executed only when the methods are included in a scope that is specified by the access token.

(13) In (1) to (12), the methods may be executed when an object that is included in a prototype chain of the target object approves the execution of the methods.

(14) In (1) to (13), in the case where the methods are executed with an approval from the object, which is included in the prototype chain of the target object, the prototype of the target object may be informed of the execution of the methods.

(15) In (1) to (14), in the case where the methods are executed with an approval from the object, which is included in the prototype chain of the target object, a method transmission owner may be informed of the execution of the methods.

(16) In (1) to (15), an object identifier may be generated by a system in a random manner.

(17) In (1) to (16), a representation has an identifier that is determined as a hash value of the representation, and a binding between the representation and a corresponding object may be performed via the identifier.

(18) In (1) to (17), in the case of execution of methods such as acquisition of a representation of an object and update of a representation of an object, along which transmission and reception of a representation occur, a representation identifier may be added to a response.

(19) In (1) to (18), in the case of execution of methods such as acquisition of a representation of an object and update of a representation of an object, along which transmission and reception of a representation occur, a representation identifier may be added at the time of method transmission, and the methods may be conditionally executed in accordance with the representation identifier, which is added.

(20) In (1) to (19), the contents of method transmission to a target object that does not have authority are stored, and the prototype of the target object may refer to the transmission contents.

(21) In (1) to (20), a token that is added at the time of method transmission may be replaced by a hash value.

(22) In (1) to (21), the prototype of the target object may be informed of an event.

(23) In (1) to (22), a notification may be stored in a queue or a stack.

(24) In (1) to (23), the contents of method transmission to an object and attendant circumstances may be recorded, and the owner may refer to the contents of the method transmission and the attendant circumstances.

(25) In (1) to (24), a transport of method transmission may be HTTP over TLS (https).

(26) In (1) to (25), the access token may be attached by using an Authorization field in an HTTP request message.

(27) In (1) to (26), cloning may be represented by POST to a factory resource.

(28) In (1) to (27), clone listing may be represented by GET to the factory resource.

(29) In (1) to (28), acquisition of a representation of an object may be represented by GET to an entity resource.

(30) In (1) to (29), update of a representation of an object may be represented by PUT to the entity resource.

(31) In (1) to (30), a transport of method transmission may be WebSocket over TLS (wss).

In addition, in the exemplary embodiment, even if the information processing apparatus 1 does not have authority with respect to a request that is received from the client apparatus 2, the information processing apparatus 1 may provide information of a prototype to the client apparatus 2 by using an access token that is received along with the request.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
at least one hardware processor configured to:
manage information of an object that determines at least one of a parent and a child of the object;
receive, from a client device outside the information processing system, an identifier of an authority object representing authority information and a request of processing that is to be executed by the at least one hardware processor using the authority object; and
determine whether to accept the request or not based on results of a comparison between the authority information represented by the identifier and information of a parent object of the authority object in a tree structure of objects, the authority information including owner information of an owner object which is verified to match information of the parent object,
wherein the owner information of the owner object, among the managed information of the object, is obtained from a validation management table in response to receiving the identifier of the authority object, and the information of the parent object of the authority object, among the managed information, is obtained according to the received identifier of the authority object from an object management table distinct from the validation management table.

2. The information processing system according to claim 1, wherein the at least one hardware processor is further configured to: control, when the request is accepted, execution of the processing that relates to the request based on a processing range that is approved by the authority information.

3. The information processing system according to claim 1, wherein the at least one hardware processor is configured to accept the request if the owner object, which approves the authority information, matches the parent object of the authority object.

4. The information processing system according to claim 1, wherein the at least one hardware processor is configured to accept the request if the parent object of the authority object in the tree structure of objects, is included in a path that sequentially links an object that is a parent, in the tree structure of objects, of the owner object, which approves the authority information.

5. The information processing system according to claim 1, wherein the at least one hardware processor is configured not to accept the request if the authority object or an object that is specified by the authority object is an object that is not among the tree structure of objects.

6. An information processing method comprising:
   managing, by an information processing system, information of an object that determines at least one of a parent and a child of the object;
   receiving, from a client device outside the information processing system, an identifier of an authority object representing authority information and a request of processing that is to be executed by at least one hardware processor using the authority object; and
   determining, by the at least one hardware processor, whether to accept the request or not based on results of a comparison between the authority information represented by the identifier and information of a parent object of the authority object in a tree structure of objects, the authority information including owner information of an owner object which is verified to match information of the parent object,
   wherein the owner information of the owner object, among the managed information of the object, is obtained from a validation management table in response to receiving the identifier of the authority object, and the information of the parent object of the authority object, among the managed information, is obtained according to the received identifier of the authority object from an object management table distinct from the validation management table.

7. A non-transitory computer readable medium storing a program causing a computer to execute a process comprising:
   managing, by an information processing system, information of an object that determines at least one of a parent and a child of the object;
   receiving, from a client device outside the information processing system, an identifier of an authority object representing authority information and a request of processing that is to be executed by at least one hardware processor using the authority object; and
   determining, by the at least one hardware processor, whether to accept the request or not based on results of a comparison between the authority information represented by the identifier and information of a parent object of the authority object in a tree structure of objects, the authority information including owner information of an owner object which is verified to match information of the parent object,
   wherein the owner information of the owner object, among the managed information of the object, is obtained from a validation management table in response to receiving the identifier of the authority object, and the information of the parent object of the authority object, among the managed information, is obtained according to the received identifier of the authority object from an object management table distinct from the validation management table.

* * * * *